United States Patent
Kitano

(10) Patent No.: US 8,040,229 B2
(45) Date of Patent: Oct. 18, 2011

(54) METHOD FOR ALARMING DECREASE IN TIRE AIR-PRESSURE USING WHEEL SPEED, VEHICLE ACCELERATION AND WHEEL SLIP RATIO

(75) Inventor: Masashi Kitano, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 481 days.

(21) Appl. No.: 12/300,749

(22) PCT Filed: May 30, 2007

(86) PCT No.: PCT/JP2007/061019
§ 371 (c)(1),
(2), (4) Date: Nov. 13, 2008

(87) PCT Pub. No.: WO2007/142101
PCT Pub. Date: Dec. 13, 2007

(65) Prior Publication Data
US 2009/0128316 A1     May 21, 2009

(30) Foreign Application Priority Data

May 31, 2006 (JP) .................................. 2006-151819

(51) Int. Cl.
*G08B 21/00* (2006.01)
(52) U.S. Cl. .................... 340/443; 340/444; 73/146.5
(58) Field of Classification Search .......... 340/442–448; 73/146–146.8
See application file for complete search history.

(56) References Cited

U.S. PATENT DOCUMENTS

| | | | |
|---|---|---|---|
| 5,561,415 | A | 10/1996 | Dieckmann |
| 5,747,686 | A | 5/1998 | Nishihara et al. |
| 5,866,812 | A | 2/1999 | Nishihara et al. |
| 6,285,280 | B1 | 9/2001 | Wang |
| 2002/0116145 | A1 | 8/2002 | Kawasaki et al. |
| 2003/0156023 | A1 | 8/2003 | Kawasaki et al. |
| 2005/0179528 | A1 | 8/2005 | Kawasaki |

FOREIGN PATENT DOCUMENTS
EP    0 768 193 A1    4/1997
(Continued)

OTHER PUBLICATIONS

Extended European Search Report dated Feb. 18, 2011 for Application No. 07744432.1.

*Primary Examiner* — Jeffery Hofsass
(74) *Attorney, Agent, or Firm* — Birch, Stewart, Kolasch and Birch, LLP

(57) ABSTRACT

An object is to provide a method capable of reducing calculation number of times for obtaining a primary regression line of a slip ratio and acceleration, and detecting a decrease in internal pressure of tires with high accuracy even in the case where is no evenness in a road surface.
The present invention is a method for alarming decrease in tire air-pressure including the steps of: detecting rotational information obtained from tires installed in a vehicle; respectively calculating a wheel velocity, a vehicle acceleration and a slip ratio of the front wheel and a slip ratio of the rear wheel from the rotational information of the respective tires; accumulating the vehicle acceleration and the slip ratio of the front wheel and the slip ratio of the rear wheel; obtaining a primary regression coefficient of the vehicle acceleration and the slip ratio of the front wheel and the slip ratio of the rear wheel; and judging whether or not the tires are decreased in the air pressure upon comparing the primary regression coefficient and a reference value of the primary regression coefficient preliminarily calculated in the above step when air pressure in the tires is the reference internal pressure.

5 Claims, 5 Drawing Sheets

FOREIGN PATENT DOCUMENTS

| | | |
|---|---|---|
| EP | 0-773-118 A1 | 5/1997 |
| EP | 1 350 641 A2 | 10/2003 |
| EP | 1 564 032 A1 | 8/2005 |
| JP | 9-104209 A | 4/1997 |
| JP | 9-104210 A | 4/1997 |
| JP | 2002-059724 A | 2/2002 |
| JP | 2003-211925 A | 7/2003 |
| JP | 2005-153652 A | 6/2005 |
| JP | 2005-186739 A | 7/2005 |
| JP | 2005-205978 A | 8/2005 |
| JP | 2005-225428 A | 8/2005 |

(a)

(b)

METHOD FOR ALARMING DECREASE IN TIRE AIR-PRESSURE USING WHEEL SPEED, VEHICLE ACCELERATION AND WHEEL SLIP RATIO

TECHNICAL FIELD

The present invention relates to a method and an apparatus for alarming decrease in tire air-pressure and a program for judging a decrease in tire air-pressure. More particularly, the present invention relates to a method and an apparatus for alarming decrease in tire air-pressure and a program for judging decrease in tire air-pressure with capable of improving performance and safety of a vehicle upon detecting a decrease in tire air-pressure based on rotational information of the tires.

BACKGROUND ART

Conventionally, with utilizing a change in a relationship between a slip ratio of tires and an acceleration of a four-wheeled vehicle, a method for judging a decrease in tire air-pressure by obtaining the relationship between the slip ratio and the acceleration from a result of primary regression calculation is proposed (for example, refer to Japanese Unexamined Patent Publication No. 211925/2003.

However, the above method is to perform regression analysis based on the least square method. Accordingly, there is a problem that even in the case where a road surface unevenness is changed within a sampling time for performing the regression analysis, only an averaged regression line is obtained but a precise regression line corresponding to the road surface unevenness is not obtained. In the primary regression analysis used in Japanese Unexamined Patent Publication No. 211925/2003, there is a problem that calculation number of times is increased and a lot of multiplication and division which impose a heavy load on a calculator are included in the calculation.

DISCLOSURE OF INVENTION

It is an object of the present invention to provide a method capable of reducing calculation number of times for obtaining a primary regression line of a slip ratio and an acceleration and detecting a decrease in tire internal pressure with high accuracy even in the case where is unevenness in a road surface.

That is, the present invention relates to a method for alarming decrease in tire air-pressure including the steps of: detecting rotational information obtained from tires installed in a vehicle; respectively calculating a wheel velocity, a vehicle acceleration and a slip ratio of the front wheel and a slip ratio of the rear wheel from the rotational information of the respective tires; accumulating the vehicle acceleration and the slip ratio of the front wheel and the slip ratio of the rear wheel; obtaining a primary regression coefficient of the vehicle acceleration and the slip ratio of the front wheel or the slip ratio of the rear wheel; and judging whether or not air pressure in the tires is decreased upon comparing the primary regression coefficient and a reference value of the primary regression coefficient preliminarily calculated in the above step when air pressure in the tires is the reference internal pressure, wherein in the case where sampling data of the accumulated slip ratio and the accumulated vehicle acceleration are continuously changed by a change amount within a fixed range of the slip ratio and the vehicle acceleration, the primary regression coefficient is calculated based on an average value of at least one point or two points in the vicinity of a start point of the sampling data and an average value of at least one point or two points in the vicinity of an end point of the sampling data.

Preferably, the method further includes the step of detecting an absolute vehicle velocity, and the vehicle acceleration is calculated from the absolute vehicle.

Preferably, the slip ratio is calculated based on a ratio between a front or rear wheel velocity and the absolute vehicle velocity so as to judge whether or not the front or rear wheels tires are decreased in air pressure.

The present invention also relates to an apparatus for alarming decrease in tire air-pressure including the means for: detecting rotational information obtained from tires installed in a vehicle; respectively calculating a wheel velocity, a vehicle acceleration and a slip ratio of the front wheel and a slip ratio of the rear wheel from the rotational information of the respective tires; accumulating the vehicle acceleration and the slip ratio of the front wheel and the slip ratio of the rear wheel; obtaining a primary regression coefficient of the vehicle acceleration and the slip ratio of the front wheel or the slip ratio of the rear wheel; and judging whether or not air pressure in the tires is decreased upon comparing the primary regression coefficient and a reference value of the primary regression coefficient preliminarily calculated in the above step when air pressure in the tires is the reference internal pressure, wherein in the case where sampling data of the accumulated slip ratio and the accumulated vehicle acceleration are continuously changed by a change amount within a fixed range of the slip ratio and the vehicle acceleration, the primary regression coefficient is calculated based on an average value of at least one point or two points in the vicinity of a start point of the sampling data and an average value of at least one point or two points in the vicinity of an end point of the sampling data.

Further, the present invention relates to a program for alarming decrease in tire air-pressure causing a computer to execute the processes of: detecting rotational information obtained from tires installed in a vehicle; respectively calculating a wheel velocity, a vehicle acceleration and a slip ratio of the front wheel and the slip ratio of the rear wheel from the rotational information of the respective tires; accumulating the vehicle acceleration and the slip ratio of the front wheel and the slip ratio of the rear wheel; obtaining a primary regression coefficient of the vehicle acceleration and the slip ratio of the front wheel or the slip ratio of the rear wheel; and judging whether or not air pressure in the tires is decreased upon comparing the primary regression coefficient and a reference value of the primary regression coefficient preliminarily calculated in the above step when air pressure in the tires are the reference internal pressure, wherein in the case where sampling data of the accumulated slip ratio and the accumulated vehicle acceleration are continuously changed by a change amount within a fixed range of the slip ratio and the vehicle acceleration, the primary regression coefficient is calculated based on an average value of at least one point or two points in the vicinity of a start point of the sampling data and an average value of at least one point or two points in the vicinity of an end point of the sampling data.

BRIEF DESCRIPTION OF DRAWINGS

FIG. 5 (b) is a graph illustrating a primary regression line in Example 2.

BEST MODES FOR CARRYING OUT THE INVENTION

Hereinafter, a method and an apparatus for alarming decrease in tire air-pressure and a program for judging a decrease in tire air-pressure will be described with reference to the attached drawings.

Figure 1:
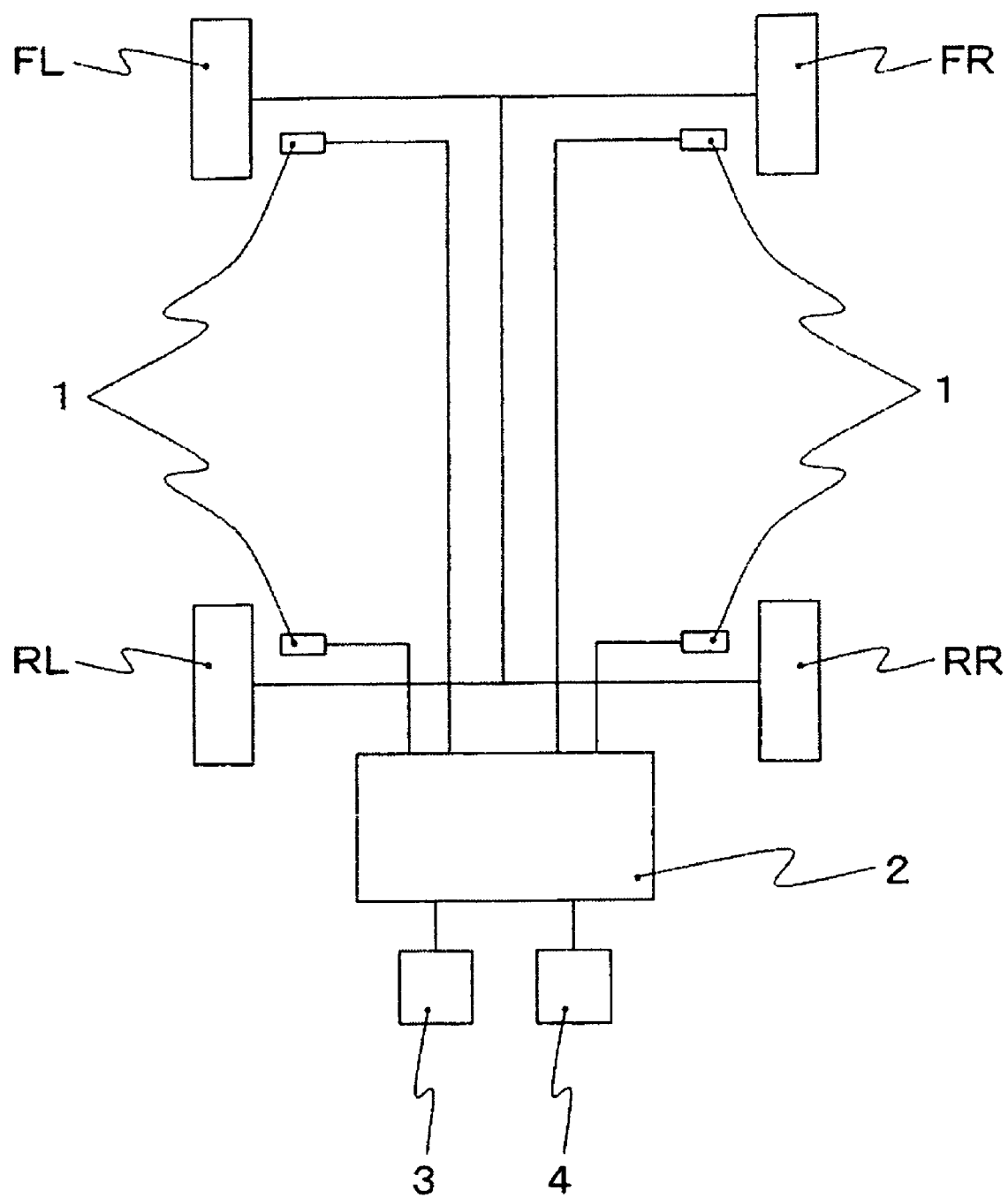
FIG. 1 is a block diagram illustrating one embodiment of an apparatus for alarming decrease in tire air-pressure according to the present invention.

As illustrated in FIG. 1, the apparatus for alarming decrease in tire air-pressure according to one embodiment of the present invention is for detecting whether or not air-pressure of four tires FL, FR, RL and RR (hereinafter, generally referred to as Wi wherein i=1 to 4, 1: front left tire, 2: front right tire, 3: rear left tire, 4: rear right tire) attached to a four-wheeled vehicle is decreased, and provided with ordinary rotational information detecting means 1 disposed in relation to the tires Wi respectively.

As the rotational information detecting means 1, wheel velocity sensors for measuring wheel velocities (rotational velocities) among rotational velocity information from the number of pulses by generating rotational pulses through an electromagnetic pickup or the like. Outputs of the rotational information detecting means 1 are supplied to a control unit 2, which is a computer such as an ABS. An alarm for decrease in internal pressure 3 including liquid crystal display elements, plasma display elements or CKT for notifying of a decrease in tire air-pressure, and an initialization switch 4 which is operated by a user when tires are exchanged or when adjustments are performed to set the internal pressure to a reference internal pressure for the tires (normal air-pressure) are connected to the control unit 2. The initialization switch 4 resets a reference value which is maintained until then and sets a new reference value upon being operated when the tires are exchanged or the tire air-pressure adjusted to normal internal pressure.

Figure 2:
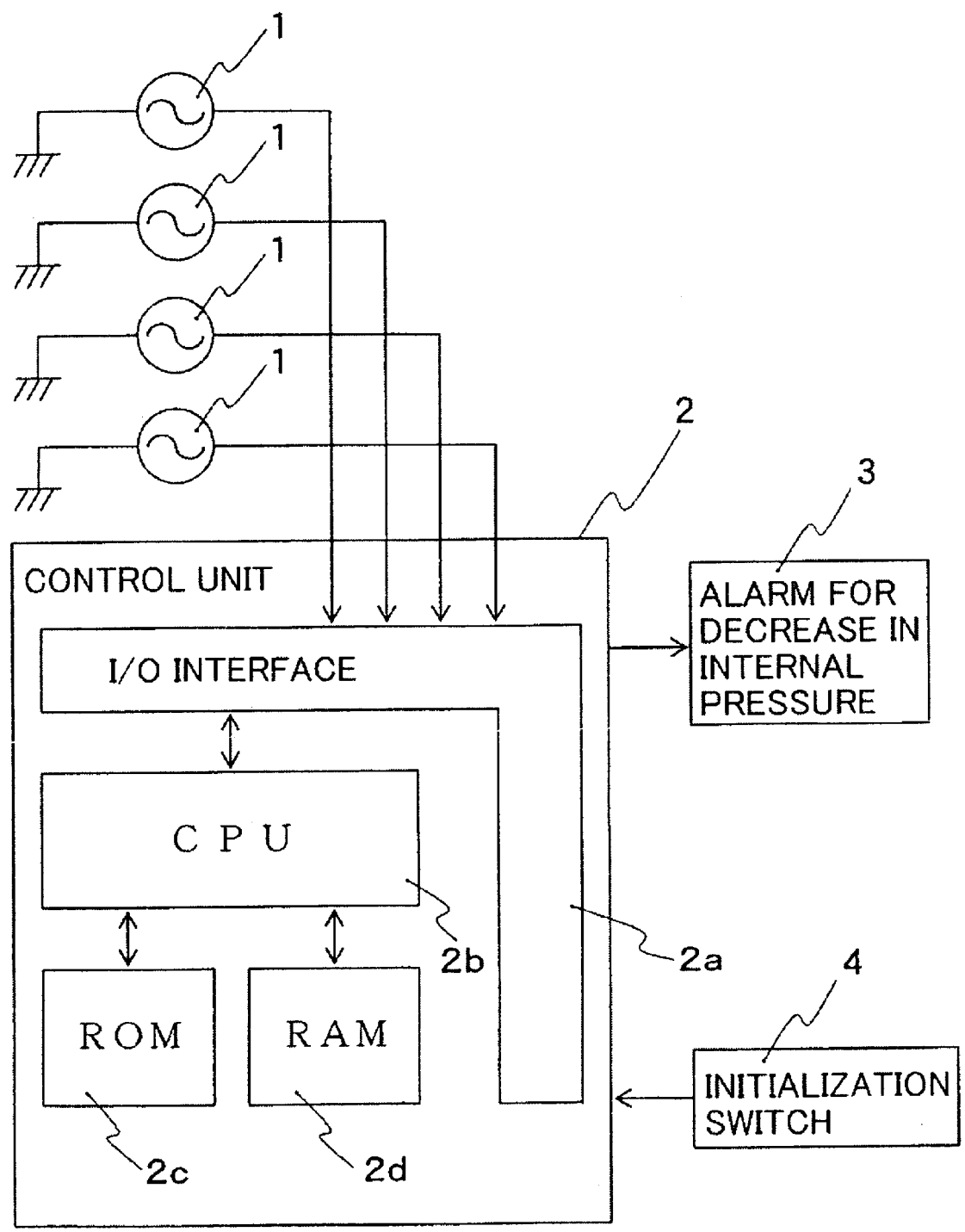
FIG. 2 is a block diagram illustrating electric arrangements of the apparatus for alarming decrease in tire air-pressure of FIG. 1.

As illustrated in FIG. 2, the control unit 2 includes an I/O interface 2a required for sending/receiving signals to/from an external device, a CPU 2b which functions as a center of calculation, a ROM 2c which stores a control operation program for the CPU 2b, and a RAM 2c into which data are temporally written and are read out therefrom when the CPU 2b performs control operations.

According to the present embodiment, due to the fact that a relationship between the vehicle acceleration and the slip ratio changes in accordance with a decrease in internal pressure of tires of driving wheels, decrease in air pressure of a single driving wheel tire or simultaneous decrease in air pressure of left and right driving wheel tires can be judged from variation per hour in a primary regression coefficient upon obtaining the vehicle acceleration and the slip ratio based on the wheel velocities of the four wheels tires. Since no changes in the primary regression coefficient are found when a following wheel tire is decreased in air pressure, no decrease in air pressure is judged accordingly. That is, no decrease in air pressure of the tires is detected unless air pressure in the driving wheel tire is decreased. It is thus possible to judge whether or not at least the driving wheel tire is decreased in air pressure. That is, it is possible to judge decrease in air pressure of a single driving wheel tire, simultaneous decrease in air pressure of left and right driving wheel tires, decrease in air pressure of a single driving wheel tire and a following wheel tire, decrease in air pressure of left and right following wheel tires and a driving wheel tire, decrease in air pressure of a single following wheel tire and decrease in air pressure of left and right driving wheel tires, as well as simultaneous decrease in air pressure of all four wheel tires. However, since detection and judgment are performed upon averaging the wheel velocities of the left and right driving wheels, accuracy of detecting decrease in air pressure of only one driving wheel and of a tire group including one driving wheel will be decreased. It is accordingly preferable to judge whether or not simultaneous decrease in air pressure of at least two wheel tires including the left and right driving wheel tires occurs. Thereby, the accuracy of judging decrease in air pressure can be improved by using the apparatus for alarming decrease in tire air-pressure according to the present embodiment together with a conventional apparatus for detecting decrease in internal pressure upon relatively comparing rotational information of tires.

Accordingly, the present embodiment includes: the rotational information detecting means 1 which detects the rotational information of the respective tires Wi; the second calculating means which calculates a wheel velocity, a vehicle acceleration and a slip ratio of the front wheel and a slip ratio of the rear wheel from the rotational information of the respective tires Wi; the accumulating means which accumulates the vehicle acceleration and the slip ratio of the front wheel and the slip ratio of the rear wheel; the third calculating means which obtains a primary regression coefficient of the vehicle acceleration and the slip ratio of the front wheel or the slip ratio of the rear wheel; the decrease in air pressure judging means which judges whether or not at least a driving wheel tire is decreased in air pressure upon comparing the primary regression coefficient and a reference value for the primary regression coefficient which is preliminarily calculated when air pressure in the tires are the reference internal pressure; and an alarm for decrease in internal pressure 3 which issues an alarm of a decrease in air-pressure based on a result of judgment of decrease in air pressure.

The program for judging decrease in tire air pressure according to the present embodiment causes the control unit 2 to function as: the first calculating means which calculates the wheel velocity, the vehicle acceleration, the slip ratio of the front wheel and the slip ratio of the rear wheel from rotational information of the tires; the accumulating means which accumulates the vehicle acceleration and the slip ratio of the front wheel and the slip ratio of the rear wheel; the third calculating means which obtains the primary regression coefficient of the vehicle acceleration and the slip ratio of the front wheel and the slip ratio of the rear wheel; and the decrease in air pressure judging means which judges whether or not at least a driving wheel tire is decreased in air pressure upon comparing the primary regression coefficient and a reference value for the primary regression coefficient which is preliminarily calculated when air pressure in the tires are the reference internal pressure.

It should be noted that it is possible to apply to detection of decrease in internal pressure of a four-wheel drive vehicle upon using an absolute velocity of a vehicle detected by a GPS device or the like for example and calculating an acceleration of the vehicle from the absolute velocity. As the GPS device, for example a VBOX manufactured by RACELOGIC can be used. Since this VBOX adapts a position identifying method called Kinematic GPS which performs correction by utilizing a phase difference of carrier wave of satellite wave, a position can be identified with high accuracy. It should be noted that the GPS device is more preferably capable of calculating a vehicle speed with high accuracy by taking advantage of the Doppler effect of the carrier wave.

Next, with regard to process for obtaining the relationship between the vehicle acceleration and the slip ratio, one example in which four wheels are simultaneously decreased in air pressure will be explained.

Figure 3:
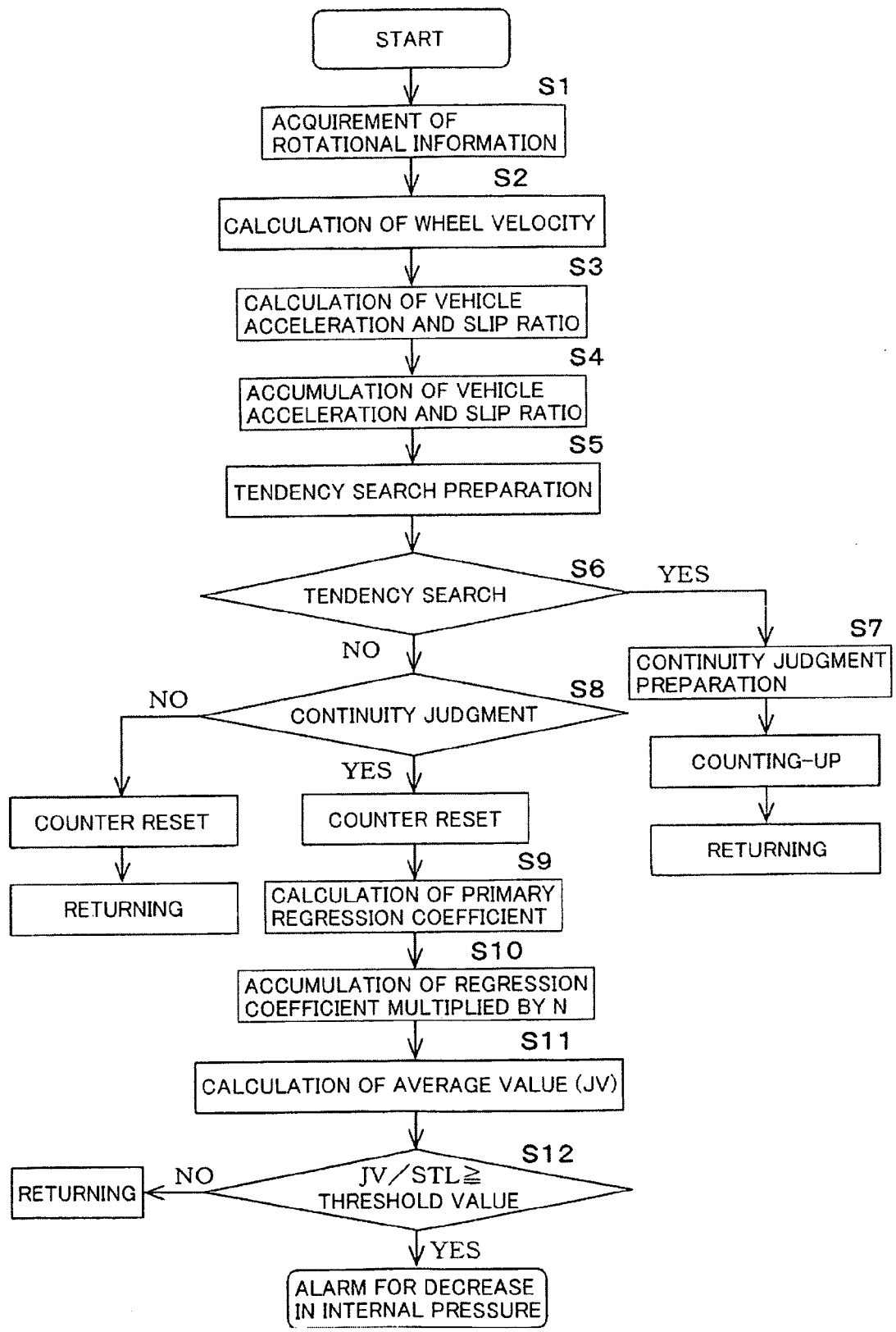
FIG. 3 is a flowchart of a program for alarming decrease in tire air-pressure according to the present invention.

As illustrated in FIG. 3, after acquiring the rotational information, the wheel velocities are calculated (Steps S1 and S2), the vehicle acceleration and the slip ratio of the front wheel and the slip ratio of the rear wheel are calculated from the wheel velocities of the four wheels (Step S3), and the obtained vehicle acceleration and the obtained slip ratio are accumulated (Step S4).

The calculation is performed for judging continuity of a change in sampling data of the slip ratio and the vehicle acceleration accumulated from a preceding sample by one (Step S5, tendency search preparation).

The continuity of the sampling data of the same tendency is judged (a detailed method will be described later).

A change from the preceding sample by one to the latest sample is Δ1, and a change from the preceding sample by two to the preceding sample by one is Δ2. In the case where it is judged that the two changes are the same tendency, the flow proceeds to Step S7 (continuity judgment preparation). In the case where the above condition is not met, it is judged that the changes are not the same tendency and the flow proceeds to Step S8 (continuity judgment) (corresponding to Step S6, tendency judgment).

In Step S7, a continuity count is counted up and the flow returns (corresponding to Step S7, continuity judgment preparation).

In Step S8, when the continuity count is at least a threshold value, it is judged to have the continuity. Then, the continuity count is cleared and the flow proceeds to Step S9. When the continuity count is less than the threshold value, the continuity count is cleared (corresponding to Step S8, continuity judgment).

Next, the primary regression coefficient of the vehicle acceleration and the slip ratio (regression coefficient of the slip ratio of front wheel or the slip ratio of the rear wheel relative to the vehicle acceleration) K1 is obtained (a detailed method will be described later) (Step S9). This primary regression coefficient (hereinafter, also simply referred to as the regression coefficient) K1 is the relationship between the vehicle acceleration and the slip ratio mentioned here, and this regression coefficient K1 is an internal pressure judgment value.

Next, the predetermined number N (for example, 20) of regression coefficients obtained from the running vehicle data are accumulated (Step S10), and as the average value, a judgment value JV of the regression coefficients is obtained (Step S11).

Immediately after preliminarily operating the initialization switch, in the same step as mentioned above, the predetermined number of the regression coefficients of the slip ratio relative to the vehicle acceleration are averaged so as to obtained a regression coefficient (reference value) STL when air pressure in the tires is the reference internal pressure, and the judgment value JV and STL are compared to each other (Step S12). In the case where a ratio between the judgment value JV and the internal pressure reference value STL (JV/STL) is at least the threshold value such as 1.4, a decrease in internal pressure is alarmed to the user. It should be noted that the threshold value is set by preliminarily conducting an experiment for a vehicle.

Hereinafter, processes (1) to (9) of actions of the apparatus for alarming decrease in tire air-pressure according to the present embodiment will be explained.

(1) The wheel velocities ($V1_n$, $V2_n$, $V3_n$, $V4_n$) are calculated from the respective rotational velocities of the four wheel tires of the vehicle FL, FR, RL and RR.

For example, wheel velocity data obtained at an arbitrary point of time of the respective wheel tires FL, FR, RL and RR from a sensor such as an ABS sensor are defined to be wheel speeds $V1_n$, $V2_n$, $V3_n$, and $V4_n$.

(2) Next, average wheel velocities of following wheels and driving wheels ($Vf_n$, $Vd_n$) are calculated.

If the vehicle is a front wheel drive vehicles, average wheel velocities of the following wheels and the driving wheels $Vf_n$, $Vd_n$ at an arbitrary point of time are obtained from the following equations (1) and (2).

$$Vf_n = (V3_n + V4_n)/2 \quad (1)$$

$$Vd_n = (V1_n + V2_n)/2 \quad (2)$$

(3) Here, the difference of slip ratio SSR between slip ratios of the left-sided front and rear wheels and right sided front and rear wheels is calculated from the following equation (3).

$$SSR = |V1/V3 - V2/V4| \quad (3)$$

(4) The vehicle acceleration (that is, average acceleration/deceleration of the vehicle from the following wheels velocities) $Af_n$ is calculated.

Supposing that an average wheel velocity obtained from wheel velocity data preceding the average wheel velocity $Vf_n$ from the following wheels velocities by one is $Vf_{n-1}$, the vehicle acceleration $Af_n$ is given by the following equation (4).

$$Af_n = (Vf_n - Vf_{n-1})/\Delta t/g \quad (4)$$

Here, $\Delta t$ is a time interval (sampling time) between wheel velocities $Vf_n$ and $Vf_{n-1}$ calculated from the wheel velocity data, and g is acceleration of gravity. It should be noted that the vehicle acceleration may be calculated from the absolute velocity by detecting the absolute velocity of the vehicle with using a device such as the GPS device.

(5) The slip ratio of the front wheel and the slip ratio of the rear wheel is calculated in accordance with the value of the vehicle acceleration $Af_n$. The slip ratio $S_n$ is calculated from the following equations (5) and (6) provided that no conditions come true in which the vehicle is making a slip with the driving wheels being in a locked condition under acceleration ($Vd_n = 0$, $Vf_n \neq 0$) or in which the driving wheels are wheel-spinning with the vehicle being in a halted condition under deceleration ($Vf_n = 0$, $Vd_n \neq 0$).

If $Af_n \geq 0$ and $Vd_n \neq 0$, $$S_n = (Vf_n - Vd_n)/Vd_n \quad (5)$$

If $Af_n < 0$ and $Vf_n \neq 0$, $$S_n = (Vf_n - Vd_n)/Vf_n \quad (6)$$

If none of the above are satisfied, $S_n = 1$ will come true.

The slip ratio and the vehicle acceleration are accumulated.

(6) The calculation is performed so as to judge the continuity of the change in the sampling data of the accumulated slip ratio and the accumulated vehicle acceleration.

It is judged how the sampling data of the same tendency are continuing.

(7) The primary regression coefficient of the slip ratio and the vehicle acceleration is obtained.

(8) The above processes are started with the count zero and repeated for example for 20 times. Next, when the count is 20, the regression coefficient (reference value) STL when air pressure in the tires is the reference internal pressure is stored. Next, the regression coefficient obtained from the rotational information is calculated, the judgment value JV of the regression coefficient as the average value for the predetermined number such as 20 is obtained and compared to the internal pressure reference value STL.

(9) In the case where a ratio between the judgment value JV and the internal pressure reference value STL (JV/STL) is at least the threshold value such as 1.4, a decrease in internal pressure is alarmed to the user. It should be noted that the threshold value is set by preliminarily conducting an experiment for a vehicle.

In the process (6), it is judged how the sampling data of the same tendency are continuing.

A change from the preceding sample by one to the latest sample is Δ1, and a change from the preceding sample by two to the preceding sample by one is Δ2. The changes have the x axis direction and the y axis direction respectively, and hence represented by Δ1x, Δ1y, Δ2x and Δ2y (corresponding to Step S5, tendency search preparation). When both Δ1x and Δ2x are positive or negative, and both Δ1y and Δ2y are positive or negative it is judged that the two changes are the same tendency and the flow proceeds to Step S7 (continuity judgment preparation). In the case where the above condition is not met, it is judged that the changes are not the same tendency and the flow proceeds to Step S8 (continuity judgment) (corresponding to Step S6, tendency judgment).

In Step S7, the continuity count is counted up and the flow returns (corresponding to Step S7, continuity judgment preparation).

In Step S7, when the continuity count is at least a threshold value, it is judged to have the continuity. Then, the continuity count is cleared and the flow proceeds to Step S5. When the continuity count is less than the threshold value, the continuity count is cleared (corresponding to Step S8, continuity judgment).

In the process (7), the primary regression coefficient of the slip ratio and the vehicle acceleration is calculated by the following method.

In the case where the sample of the slip ratio or the vehicle acceleration is continuously changed, a line connecting a sampling start point (point group) and an end point (point group) is a primary regression line. Here, the "point group" indicates that regression accuracy depends on accuracy of detection of the sampling start point and the sampling end point. For example, supposing that an average coordinate of three points including the start point and two points before and after (in terms of time) the start point is a start point, the regression accuracy can be improved. Specifically, in the case where the vehicle acceleration is continuously changed by at least 10 samples and a change amount in the meantime is continuously at least 0.02 G, a line connecting the start point and the end point can be the primary regression line.

In order to adjust the regression accuracy, the change amounts of the samples are obtained and it is judged how many samples of the same tendency are continuing. For example, a change from the preceding sample by one to the latest sample is Δ1, and a change from the preceding sample by two to the preceding sample by one is Δ2. In consideration to the x axis direction and the y axis direction, the changes are represented by Δ1x, Δ1y, Δ2x and Δ2y. When it is judged whether both Δ1x and Δ2x are positive or negative and both are the same, and both Δ1y and Δ2y are positive or negative and both are the same, it can be judged that the two changes are continuing (of the same tendency). Further, both Δ1x and Δ1y may be the same sign. In order to improve reliability of a result, a fixed limit is provided not only for positiveness or negativeness but also for a degree of Δ1x and Δ2x and a degree of Δ1y and Δ2y respectively and an amount of the limit may be adjusted. For example, a fixed threshold value is provided, and the values are adapted as the samples only when the change amounts are at least the threshold value (or at most the threshold value).

Next, a specific example will be explained. For example, supposing the case where a slope of the primary regression line is calculated from (x, y) of the ten samples continuously changed with the same tendency. In a conventional method, based on the following equation (7), the slope of the primary regression line is obtained from a sum of x, a sum of y, a square sum of x, a square sum of y, and a sum of the product of x and y. Here, 9 times of addition is required for obtaining the sum, that is, 18 times for x and y; 10 times of multiplication and 9 times of addition are required for obtaining the square sum, that is, 19 times of calculation and 38 times for x and y; and 10 times of multiplication and 9 times of addition are required for obtaining the sum of the product of x and y, that is, 1.9 times of calculation. In total, 75 times of calculation is required (45 times of addition and 30 times of multiplication).

[Numerical Expression 1]

$$K1 = \frac{\Sigma x_i \Sigma y_i - N\Sigma x_i y_i}{\Sigma x_i \Sigma x_i - N\Sigma x_i^2} \quad (7)$$

Meanwhile, in the method of the present invention, the slope of the primary regression line is obtained from coordinates of the start point (point group) and the end point (point group). Here, a start point coordinate is (x1, y1) and an end point coordinate is (x2, y2), the start point is determined by an average coordinate of a start point group of three points, and the end point is determined by an average coordinate of an end point group of three points. In order to determine the x-coordinate of the start point, 2 times of addition and one division are required, and in order to determine the x- and y-coordinates of the start point and the end point, 1.2 times of calculation is required. In addition to this, the slope is obtained from (y2−y1)/(x2−x1), 2 times of subtraction and one division are required. Therefore, in total, 15 times of calculation is required (8 times of addition, 2 times of subtraction and 5 times of division).

Further, there is another need for calculation in order to judge the continuity of the sample change. In order to examine whether or not the change from the preceding sample by one to the latest sample is of the same tendency as the preceding sample by two to the preceding sample by one, the change amount in the x axis direction (2 times of subtraction) and the change amount in the y axis direction (2 times of subtraction), that is, 4 times of subtraction and 2 times of comparison operation have to be performed for 8 times from the third sample to the tenth sample. Therefore, in total, 48 times of calculation is required for inspecting the continuity. In addition, supposing that the point group including three points (three samples) is used for calculating a value corresponding the slope of the regression line, 15 times of calculation, that is, in total, only 63 times of calculation is required (8 times of addition, 34 times of subtraction, 5 times of division and 16 times of comparison operation).

In a calculator, the loads of multiplication and division are larger than addition, subtraction and comparative operation. Therefore, according to the present invention, it can be said that an effect of reducing multiplication and division is larger than reduction of the number of calculation.

The number of samples does not have to be particularly fixed. The number of samples may be determined (to be at least 7 for example) taking a scale in the x axis direction and an interval in the y axis direction between the sampling start point (point group) and the sampling end point (point group) as a guide.

In the case where conventional regression calculation is used, the number of samples for the regression calculation is not easily optimized in accordance with a situation and hence normally fixed. However, depending on the number of samples for the regression calculation, there is sometimes a case where only an averaged result is obtained. When the number of samples is fixed, the sampling time is fixed. In the case where the sampling time is fixed to be 10 seconds, it is fine if slipperiness of tires to a road surface is constant all for 1.0 seconds. However, in the case where the slipperiness of tires to the road surface is not constant for 10 seconds, for example the road composed of asphalt is covered with ice, only the slipperiness of tires to the road surface including the slipperiness of tires to the road composed of asphalt and the slipperiness of tires to the road composed of asphalt is covered with ice in proportion to the time length to be included is obtained. It should be noted that since the change in slope of the regression line of the acceleration and the slip ratio corresponds to a change in a friction coefficient of the tires and the road surface, the change will be explained with using an indicator for slipperiness.

Figure 4:
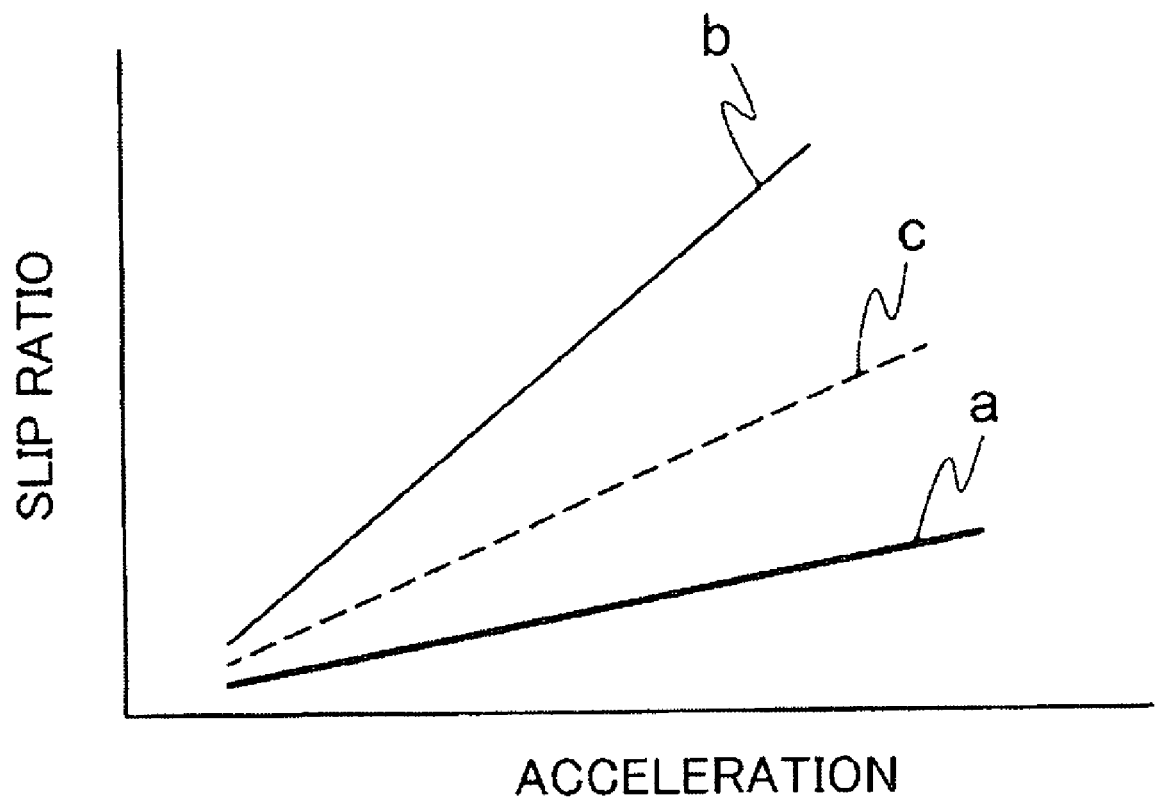
FIG. 4 is a schematic view of a primary regression line representing a degree of slipperiness of tires on a road surface.

In the case where the vehicle runs on a road surface for which two regression lines are obtained as shown in FIG. 4 by dividing the sampling time into half; for example, for 5 seconds on asphalt and for 5 seconds on ice when the sampling time is 10 seconds, the primary regression line obtained from the sampling data is an average of a (asphalt) and b (ice) (a dot line c in FIG. 4). Meanwhile, according to the method of the present invention, different regression lines are obtained respectively on ice and on asphalt. By obtaining an average value for each of the obtained regression lines, accuracy of a result of the regression calculation is not inferior.

EXAMPLE

Hereinafter, the present invention will be explained based on Examples. However, the present invention is not limited to only Examples.

With regard to the case where the calculation method of the primary regression coefficient in the present invention and a general least square method are used, a difference in accuracy in accordance with tendency of sampling data is examined.

Example 1

20 sets of sampling data (x, y)=(A, B) are obtained, sampling data 1 to 10 are a section 1 and sampling data 11 to 20 are a section 2 (Table 1).

Figure 5:
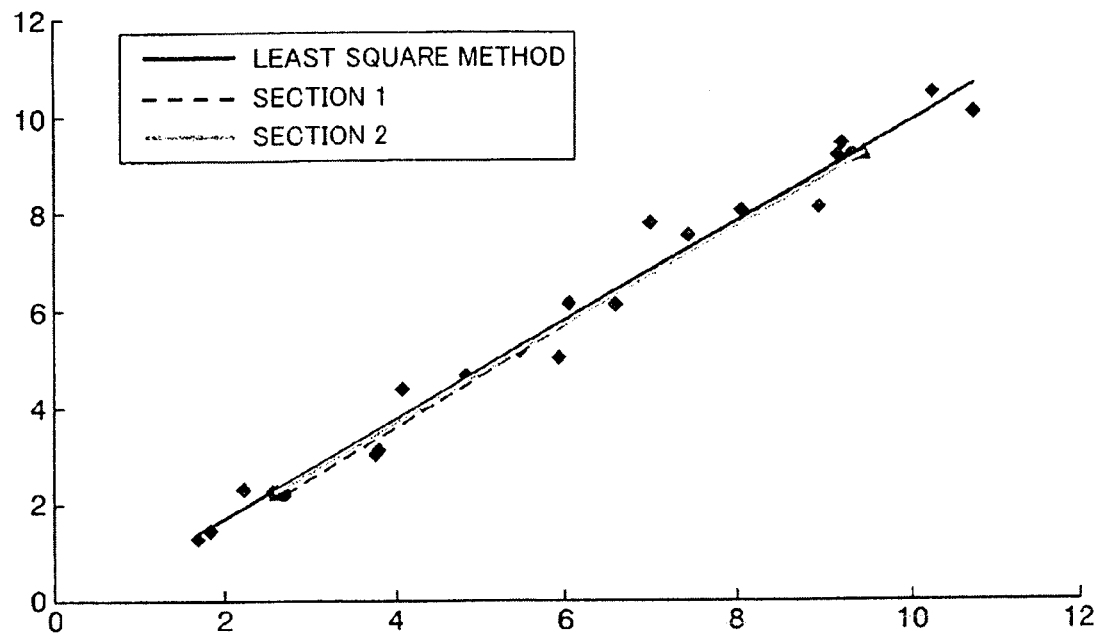
FIG. 5 (a) is a graph illustrating a primary regression line in Example 1.
Figure 5:
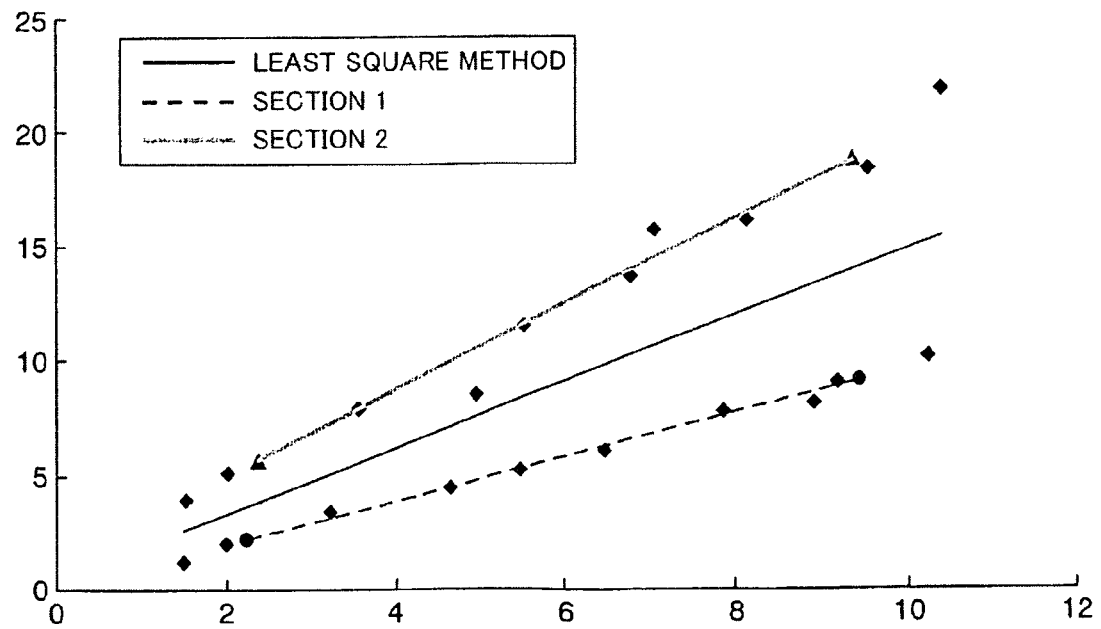

In the section 1, an average value of the sampling data 1 to 3 is a start point, the sampling data 8 to 10 are an end point, and an equation of a line connecting the start point and the end point is obtained. Similarly in the section 2, an average value of the sampling data 11 to 13 is a start point, the sampling data 18 to 20 are an end point, and an equation of a line connecting the start point and the end point is obtained. With regard to the sampling data 1 to 20, an equation of the primary regression line is obtained with using the least square method. A result is illustrated in FIG. 5(*a*).

Section 1: $y=1.032\,x-0.823$

Section 2: $y=1.075\,x-0.951$

Least square method: $y=1.009\,x-0.333$

It should be noted that in Table 1, a coefficient C is a value obtained by estimating a coefficient B from a coefficient A with using the primary regression coefficient obtained by the least square method, and a difference D is a difference between the coefficient B and the coefficient C. A coefficient C' is a value obtained by estimating a coefficient B from a coefficient A with using the primary regression coefficient obtained by the method according to the present invention, and a difference D' is a difference between the coefficient B and the coefficient C'.

TABLE 1

|    | A     | B     | C     | D(=B − C) | D² | C'    | D'(=B − C') | D'² |
|----|-------|-------|-------|-----------|------|-------|-------------|-------|
| 1  | 10.74 | 10.57 | 10.50 | 0.07      | 0.00 | 10.25 | 0.32        | 0.10  |
| 2  | 9.99  | 9.12  | 9.75  | −0.63     | 0.40 | 9.49  | −0.36       | 0.13  |
| 3  | 8.72  | 8.22  | 8.47  | −0.25     | 0.06 | 8.17  | 0.05        | 0.00  |
| 4  | 7.24  | 7.03  | 6.97  | 0.06      | 0.00 | 6.64  | 0.39        | 0.15  |
| 5  | 6.43  | 6.17  | 6.15  | 0.02      | 0.00 | 5.80  | 0.37        | 0.14  |
| 6  | 5.40  | 5.48  | 5.12  | 0.36      | 0.13 | 4.75  | 0.73        | 0.53  |
| 7  | 4.34  | 4.88  | 4.04  | 0.84      | 0.71 | 3.65  | 1.23        | 1.52  |
| 8  | 3.95  | 3.51  | 3.66  | −0.14     | 0.02 | 3.25  | 0.26        | 0.07  |
| 9  | 2.94  | 2.00  | 2.64  | −0.64     | 0.40 | 2.21  | −0.21       | 0.04  |
| 10 | 1.93  | 1.12  | 1.61  | −0.50     | 0.25 | 1.16  | −0.05       | 0.00  |
| 11 | 10.27 | 10.03 | 10.03 | 0.00      | 0.00 | 10.09 | −0.06       | 0.00  |
| 12 | 9.37  | 9.19  | 9.13  | 0.06      | 0.00 | 9.13  | 0.06        | 0.00  |
| 13 | 8.93  | 8.64  | 8.68  | −0.04     | 0.00 | 8.65  | −0.01       | 0.00  |
| 14 | 7.34  | 7.00  | 7.08  | −0.08     | 0.01 | 6.94  | 0.06        | 0.00  |
| 15 | 6.02  | 6.27  | 5.74  | 0.53      | 0.28 | 5.52  | 0.75        | 0.56  |
| 16 | 5.23  | 5.25  | 4.95  | 0.30      | 0.09 | 4.68  | 0.57        | 0.33  |
| 17 | 4.09  | 4.07  | 3.79  | 0.28      | 0.08 | 3.44  | 0.63        | 0.40  |
| 18 | 3.64  | 3.09  | 3.34  | −0.25     | 0.06 | 2.96  | 0.13        | 0.02  |
| 19 | 2.77  | 2.67  | 2.46  | 0.21      | 0.04 | 2.03  | 0.64        | 0.41  |
| 20 | 1.58  | 1.04  | 1.26  | −0.22     | 0.05 | 0.75  | 0.29        | 0.09  |

Example 2

20 sets of sampling data (x, y)=(A, B) which are different from Example 1 are obtained (Table 2), and an equation of the primary regression line is similarly obtained. A result is illustrated in FIG. 5(b).

Section 1: y=0.954 x+0.293

Section 2: y=2.253 x−2.546

Least square method: y=1.443 x+0.388

TABLE 2

|    | A     | B     | C     | D(=B − C) | D²    | C'    | D'(=B − C') | D'²   |
|----|-------|-------|-------|-----------|-------|-------|-------------|-------|
| 1  | 10.29 | 10.22 | 15.24 | −5.02     | 25.21 | 10.12 | 0.10        | 0.01  |
| 2  | 9.30  | 9.26  | 13.80 | −4.55     | 20.69 | 9.16  | 0.09        | 0.01  |
| 3  | 8.30  | 8.01  | 12.36 | −4.34     | 18.87 | 8.21  | −0.20       | 0.04  |
| 4  | 7.93  | 7.27  | 11.83 | −4.56     | 20.76 | 7.86  | −0.59       | 0.34  |
| 5  | 6.28  | 6.02  | 9.45  | −3.44     | 11.82 | 6.29  | −0.27       | 0.07  |
| 6  | 5.33  | 5.02  | 8.09  | −3.06     | 9.38  | 5.38  | −0.36       | 0.13  |
| 7  | 4.90  | 4.01  | 7.45  | −3.45     | 11.88 | 4.96  | −0.96       | 0.92  |
| 8  | 3.00  | 3.55  | 4.72  | −1.17     | 1.37  | 3.16  | 0.39        | 0.15  |
| 9  | 2.33  | 2.12  | 3.76  | −1.63     | 2.67  | 2.52  | −0.40       | 0.16  |
| 10 | 1.22  | 1.46  | 2.15  | −0.69     | 0.47  | 1.46  | 0.01        | 0.00  |
| 11 | 10.54 | 21.33 | 15.59 | 5.74      | 32.99 | 21.19 | 0.14        | 0.02  |
| 12 | 9.66  | 19.63 | 14.33 | 5.30      | 28.11 | 19.22 | 0.41        | 0.17  |
| 13 | 8.84  | 16.81 | 13.14 | 3.67      | 13.50 | 17.36 | −0.55       | 0.30  |
| 14 | 7.05  | 14.04 | 10.56 | 3.48      | 12.11 | 13.34 | 0.70        | 0.49  |
| 15 | 6.23  | 13.41 | 9.38  | 4.03      | 16.26 | 11.49 | 1.92        | 3.68  |
| 16 | 5.32  | 10.72 | 8.07  | 2.65      | 7.03  | 9.45  | 1.27        | 1.62  |
| 17 | 4.14  | 8.66  | 6.36  | 2.30      | 5.27  | 6.78  | 1.87        | 3.51  |
| 18 | 3.62  | 7.38  | 5.62  | 1.76      | 3.09  | 5.62  | 1.76        | 3.09  |
| 19 | 2.02  | 5.52  | 3.31  | 2.21      | 4.90  | 2.01  | 3.51        | 12.31 |
| 20 | 1.05  | 2.65  | 1.90  | 0.75      | 0.57  | −0.19 | 2.84        | 8.07  |

As in Example 1, in the case where the change amount of the sampling data (corresponding to the vehicle acceleration and the slip ratio) is not changed so much in the data of the fixed number of samples, there is no difference in accuracy between the method of the present invention and the conventional least square method. Meanwhile, as in Example 2, in the case where the tendency of the change amount of the sampling data is remarkably changed taking an arbitrary point of time as a boundary, the regression line can be obtained with accuracy which is higher than the least square method.

In the case of Example 2 or similar, it is often judged that there is no continuity between the data of two groups. Different regression lines are not obtained at the same time by dividing a data group of Table 2 into two groups but are obtained from a data group for which it is judged that there is the continuity by then (the regression line calculation of the data group 1 to 10 in Table 2 is executed taking the fact that there is no continuity between 10 and 1.1 as a trigger). When it is judged that there is no continuity between data, there is continuity between immediately preceding data and there is continuity between several data so as to satisfy a fixed standard (at least samples between 2 data=3 data are required), the regression line calculation is performed.

INDUSTRIAL APPLICABILITY

According to the method of the present invention, when the relationship between the slip ratio and the acceleration is obtained, the number of calculation can be reduced in comparison to the conventional primary regression calculation, and even in the case where is unevenness in a road surface, a decrease in internal pressure of tires can be detected with high accuracy.

The invention claimed is:

1. A method for alarming decrease in tire air-pressure of tires on wheels installed on a vehicle, comprising the steps of:
   a) detecting rotational information obtained from the wheels;
   b) respectively calculating a wheel speed, a vehicle acceleration and a slip ratio of a front wheel and a slip ratio of a rear wheel from the rotational information of the respective wheels;
   c) accumulating the vehicle acceleration and the slip ratio of the front wheel and the slip ratio of the rear wheel;
   d) obtaining a primary regression coefficient of the vehicle acceleration and the slip ratio of the front wheel or the slip ratio of the rear wheel; and
   e) judging whether or not the tires are decreased in the air pressure upon comparing the primary regression coefficient and a reference value of the primary regression coefficient preliminarily calculated in step d) when air pressure in the tires is at a reference internal pressure, wherein
   in the case where sampling data of the accumulated slip ratio and the accumulated vehicle acceleration are continuously changed by a change amount within a fixed range of the slip ratio and the vehicle acceleration, the primary regression coefficient is calculated based on an average value of at least one point or two points in the vicinity of a start point of the sampling data and an average value of at least one point or two points in the vicinity of an end point of the sampling data.

2. The method for alarming decrease in tire air-pressure of claim 1, wherein the method further includes the step of detecting an absolute velocity of the vehicle, and the vehicle acceleration is calculated from the absolute velocity.

3. The method for alarming decrease in tire air-pressure of claim 2, wherein the slip ratio is calculated based on a ratio between a front wheel velocity or a rear wheel velocity and the absolute velocity of the vehicle so as to judge whether or not the tires of the front or rear wheels are decreased in the air pressure.

4. An apparatus for alarming decrease in tire air-pressure of tires on wheels installed on a vehicle, comprising the means for:
   a) detecting rotational information obtained from the wheels;

b) respectively calculating a wheel velocity, a vehicle acceleration and a slip ratio of a front wheel and a slip ratio of a rear wheel from the rotational information of the respective wheels;
c) accumulating the vehicle acceleration and the slip ratio of the front wheel and the slip ratio of the rear wheel;
d) obtaining a primary regression coefficient of the vehicle acceleration and the slip ratio of the front wheel or the slip ratio of the rear wheel; and
e) judging whether or not the tires are decreased in the air pressure upon comparing the primary regression coefficient and a reference value of the primary regression coefficient preliminarily calculated in means d) when air pressure in the tires is at a reference internal pressure, wherein in the case where sampling data of the accumulated slip ratio and the accumulated vehicle acceleration are continuously changed by a change amount within a fixed range of the slip ratio and the vehicle acceleration, the primary regression coefficient is calculated based on an average value of at least one point or two points in the vicinity of a start point of the sampling data and an average value of at least one point or two points in the vicinity of an end point of the sampling data.

5. A program carried on computer-readable media for alarming decrease in tire air-pressure of tires on wheels installed on a vehicle, the program, when executed, causing a computer to execute the processes of:

a) detecting rotational information obtained from the wheels;
b) respectively calculating a wheel velocity, a vehicle acceleration and a slip ratio of a front wheel and a slip ratio of a rear wheel from the rotational information of the respective wheels;
c) accumulating the vehicle acceleration and the slip ratio of the front wheel and the slip ratio of the rear wheel;
d) obtaining a primary regression coefficient of the vehicle acceleration and the slip ratio of the front wheel or the slip ratio of the rear wheel; and
e) judging whether or not the tires are decreased in the air pressure upon comparing the primary regression coefficient and a reference value of the primary regression coefficient preliminarily calculated in process d) when air pressure in the tires is at a reference internal pressure, wherein in the case where sampling data of the accumulated slip ratio and the accumulated vehicle acceleration are continuously changed by a change amount within a fixed range of the slip ratio and the vehicle acceleration, the primary regression coefficient is calculated based on an average value of at least one point or two points in the vicinity of a start point of the sampling data and an average value of at least one point or two points in the vicinity of an end point of the sampling data.

* * * * *